United States Patent
Milton et al.

(10) Patent No.: US 8,416,900 B2
(45) Date of Patent: Apr. 9, 2013

(54) METHOD AND CIRCUIT FOR DYNAMICALLY CHANGING THE FREQUENCY OF CLOCK SIGNALS

(75) Inventors: David Wills Milton, Underhill, VT (US); Jason Edward Rotella, Mineville, NY (US)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 12/354,305

(22) Filed: Jan. 15, 2009

(65) Prior Publication Data

US 2009/0122936 A1    May 14, 2009

Related U.S. Application Data

(63) Continuation of application No. 11/161,335, filed on Jul. 29, 2005, now Pat. No. 7,515,666.

(51) Int. Cl.
*H04L 7/00* (2006.01)

(52) U.S. Cl.
USPC ........... 375/354; 375/359; 375/361; 375/362; 375/365; 327/141; 327/144; 327/145; 327/147; 370/503; 370/516

(58) Field of Classification Search .................. 375/354
See application file for complete search history.

(56) References Cited

U.S. PATENT DOCUMENTS

| | | | |
|---|---|---|---|
| 4,262,364 A | 4/1981 | Fujita | |
| 5,365,130 A | 11/1994 | Murray et al. | |
| 5,537,582 A | 7/1996 | Draeger | |
| 5,600,824 A | 2/1997 | Williams et al. | |
| 5,634,116 A | 5/1997 | Singer | |
| 5,664,165 A * | 9/1997 | Curry et al. | 713/501 |
| 5,754,833 A * | 5/1998 | Singh et al. | 713/400 |
| 5,758,131 A | 5/1998 | Taylor | |
| 5,796,995 A | 8/1998 | Nasserbakht et al. | |
| 5,898,640 A | 4/1999 | Ben-Meir et al. | |
| 5,915,107 A * | 6/1999 | Maley et al. | 713/400 |
| 5,961,649 A | 10/1999 | Khandekar et al. | |
| 6,006,340 A | 12/1999 | O'Connell | |
| 6,049,887 A | 4/2000 | Khandekar et al. | |
| 6,194,927 B1 * | 2/2001 | Crowley et al. | 327/147 |
| 6,272,646 B1 * | 8/2001 | Rangasayee et al. | 713/500 |
| 6,333,653 B1 | 12/2001 | Floyd et al. | |
| 6,661,254 B1 | 12/2003 | Agrawal et al. | |
| 6,928,574 B1 * | 8/2005 | Radjassamy | 713/501 |
| 2003/0141908 A1 | 7/2003 | Stong | |
| 2004/0113668 A1 | 6/2004 | Gaskins et al. | |
| 2004/0223570 A1 * | 11/2004 | Adkisson | 375/359 |
| 2005/0218937 A1 * | 10/2005 | Johnson et al. | 327/2 |
| 2006/0023819 A1 * | 2/2006 | Adkisson et al. | 375/354 |

OTHER PUBLICATIONS

Notice of Allowance (Mail Date Nov. 14, 2008) for U.S. Appl. No. 11/161,335, filed Jul. 29, 2005; Confirmation No. 2334.

* cited by examiner

*Primary Examiner* — Kabir A Timory
*Assistant Examiner* — Gina McKie
(74) *Attorney, Agent, or Firm* — Schmeiser, Olsen & Watts; Michael LeStrange

(57) ABSTRACT

A method and circuit for dynamically changing the frequency of clock signals. The method including: detecting an edge of a first clock signal operating at a first frequency using a second clock signal operating at a second frequency; detecting an edge of the second clock signal using the first clock signal; detecting coincident edges of the first and the second clock signals; and changing the second frequency to a third frequency different from the second frequency upon detection of the coincident edges.

8 Claims, 9 Drawing Sheets

METHOD AND CIRCUIT FOR DYNAMICALLY CHANGING THE FREQUENCY OF CLOCK SIGNALS

This application is a continuation of U.S. patent application Ser. No. 11/161,335 filed on Jul. 29, 2005, now U.S. Pat. No. 7,515,666, issued Apr. 7, 2009.

FIELD OF THE INVENTION

The present invention relates to the field of electronic circuits; more specifically, a method and circuit for dynamically changing the frequency of clock signals.

BACKGROUND OF THE INVENTION

Modern integrated circuit chips contain circuits in different regions of the integrated circuit chip running at different clock frequencies and often these circuits must send signals to each other. The clock frequencies in the different regions of the integrated circuit chip may or may not be integer ratios of each other. Further, it is often desirable to change the frequency of one or more clocks while the integrated circuits are active. Presently, methods to effect clock frequency changes require reliance on stored information of the ratio of the clock frequencies, cause glitches when the clock frequencies are changed (elongated or shorted transitional clock pulses are generated), require a system wide reset or limit the frequencies of the clock signal in some manner, all of which are not desirable in many circuit applications.

Therefore, there is a need for a method and circuit that allows dynamic clock frequency changes that does not require reliance on stored information of the ratio of the clock frequencies, cause glitches when the clock frequencies are changes, require a system wide reset or limit the frequencies of the clock signals.

SUMMARY OF THE INVENTION

A first aspect of the present invention is: a method, comprising: detecting an edge of a first clock signal operating at a first frequency using a second clock signal operating at a second frequency; detecting an edge of the second clock signal using the first clock signal; detecting coincident edges of the first and the second clock signals; and changing the second frequency to a third frequency different from the second frequency upon detection of the coincident edges.

A second aspect of the present invention is the first aspect of the present invention wherein all the coincident edges are rising edges.

A third aspect of the present invention is the first aspect of the present invention, wherein all the coincident edges are falling edges.

A fourth aspect of the present invention is the first aspect of the present invention, wherein the first and the second frequencies are different.

A fifth aspect of the present invention is the first aspect of the present invention, wherein the first and the third frequencies are different.

A sixth aspect of the present invention is the first aspect of the present invention, wherein the first, the second and the third frequencies are different from each other.

A seventh aspect of the present invention is the first aspect of the present invention, wherein the first and third frequencies are whole integer multiples of one another.

An eighth aspect of the present invention is the first aspect of the present invention, wherein the first frequency and third frequencies are not whole integer multiples of one another.

A ninth aspect of the present invention is the first aspect of the present invention, further including: generating the first clock frequency by dividing a third clock signal operating at a fourth frequency and generating the second clock signal by dividing a fourth clock signal operating at a fifth frequency.

A tenth aspect of the present invention is the ninth aspect of the present invention further including: generating the third clock signal and the fourth clock signal by dividing a fifth clock signal operating at a sixth frequency.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
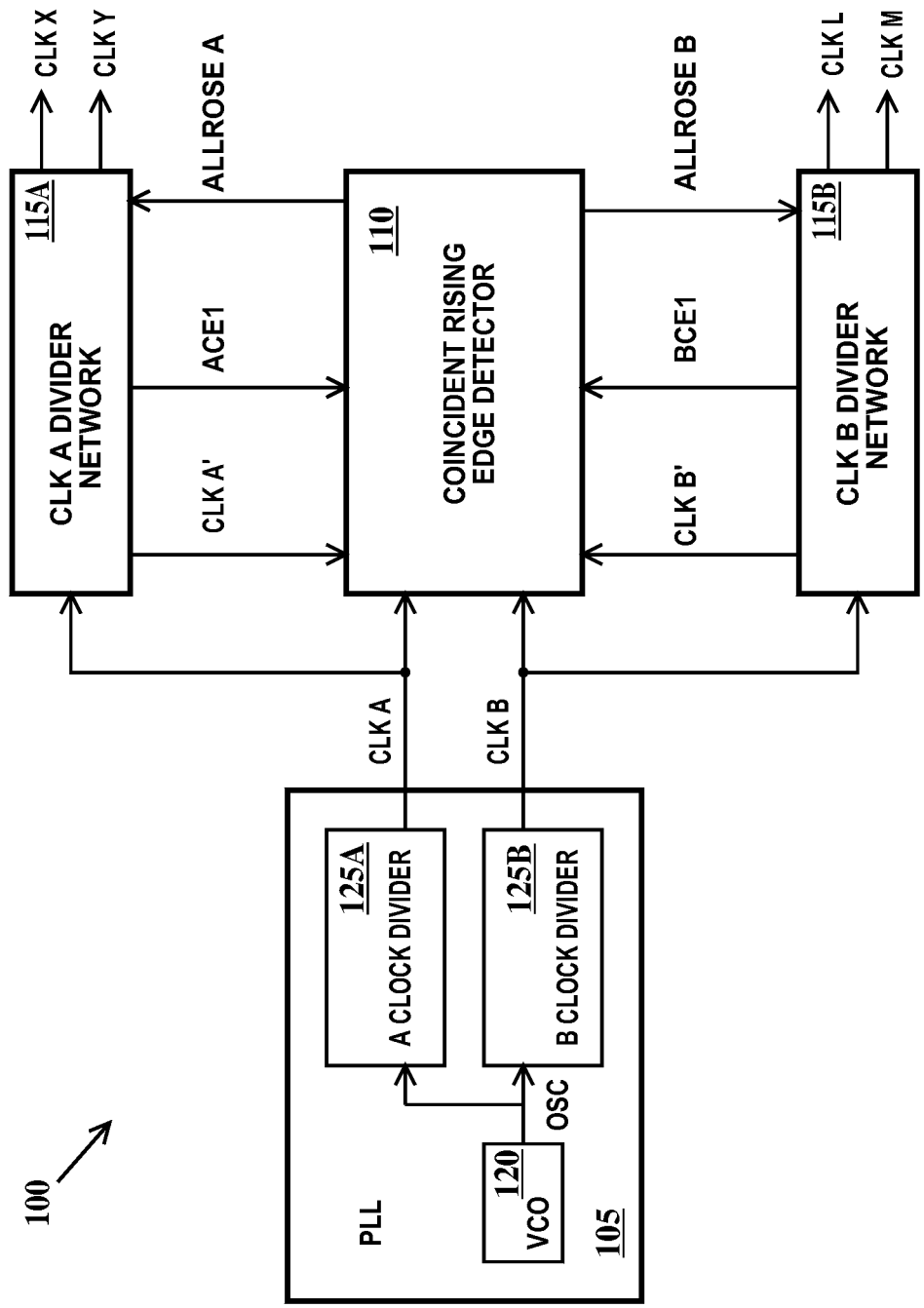
FIG. 1 is an exemplary schematic circuit diagram of a circuit for dynamically changing clock frequencies according to a first embodiment of the present invention.

FIG. 1 is an exemplary schematic circuit diagram of a circuit for dynamically changing clock frequencies according to a first embodiment of the present invention. In FIG. 1, a clock circuit 100 includes a phase locked loop circuit (PLL) 105 coupled to a coincident rising edge detector circuit (CRED) 110 and coupled to an CLK A divider network 115A and a CLK B divider network 115B. CLK A divider network 115A and CLK N divider network 115B are each coupled to CRED 110. PLL 105 includes a voltage controlled oscillator (VCO) 120 coupled to an A clock divider 125A and to a B clock divider 125B.

VCO 120 generates a oscillator signal (OSC) which is supplied to A and B clock dividers 125A and 125B. A clock divider 125A generates an A clock signal (CLK A) from OSC and passes CLK A to CRED 110 and A clock divider 115A. B clock divider 125B generates a B clock signal (CLK B) and passes CLK B to CRED 110 and B clock divider 115B. Clock A divider network 115A generates an X clock signal (CLK X), a Y clock signal (CLK Y) and a delayed A clock signal CLK A' from CLK A, CLK A' being coupled to CRED 110.

Clock A divider network 115A also generates a CLK A coincident edge in one CLK A' cycle signal (ACE1) which is coupled to CRED 110. Clock B divider network 115B generates an L clock signal (CLK L), an M clock signal (CLK M) and a delayed B clock signal CLK B' from CLK B, CLK B' being coupled to CRED 110. Clock B divider network 115B also generates a CLK B coincident edge in one CLK B' cycle signal (BCE1) which is coupled to CRED 110

CRED 110 generates an ALLROSE A signal which indicates that CLK A and all clocks derived from CLK A (CLK X and CLK Y) and CLK B and all clocks derived from CLK B (CLK L and CLK M) have just had coincident rising edges. ALLROSE A is coupled to A clock divider network 115A. ALLROSE A is asserted until the next rising edge of CLK A and is valid in the CLK A domain. CRED 110 generates an ALLROSE B signal which indicates that CLK B and all clocks derived from CLK B (CLK L and CLK M) and CLK A and all clocks derived from CLK A (CLK X and CLK Y) have just had coincident rising edges. ALLROSE B is coupled to B clock divider network 115B. ALLROSE B is asserted until the next rising edge of CLK B and is valid in the CLK B domain. ALLROSE A may be used to adjust the CLK X, CLK Y frequencies. ALLROSE B may be used to adjust the CLK L, CLK M frequencies.

ACE1 provide an early sample of CLK A rising edges, BCE1 provide an early sample of CLK B rising edges, ALLROSE A indicates when CLK A, CLK X, CLK Y, CLK B, CLKL and CLK M have coincident rising edges and ALLROSE B indicates when CLK B, CLK L, CLK M, CLK A, CLK X and CLK Y have coincident rising edges as illustrated in FIGS. 2A, 2B, 3 and 4 and described infra.

Figure 2A:
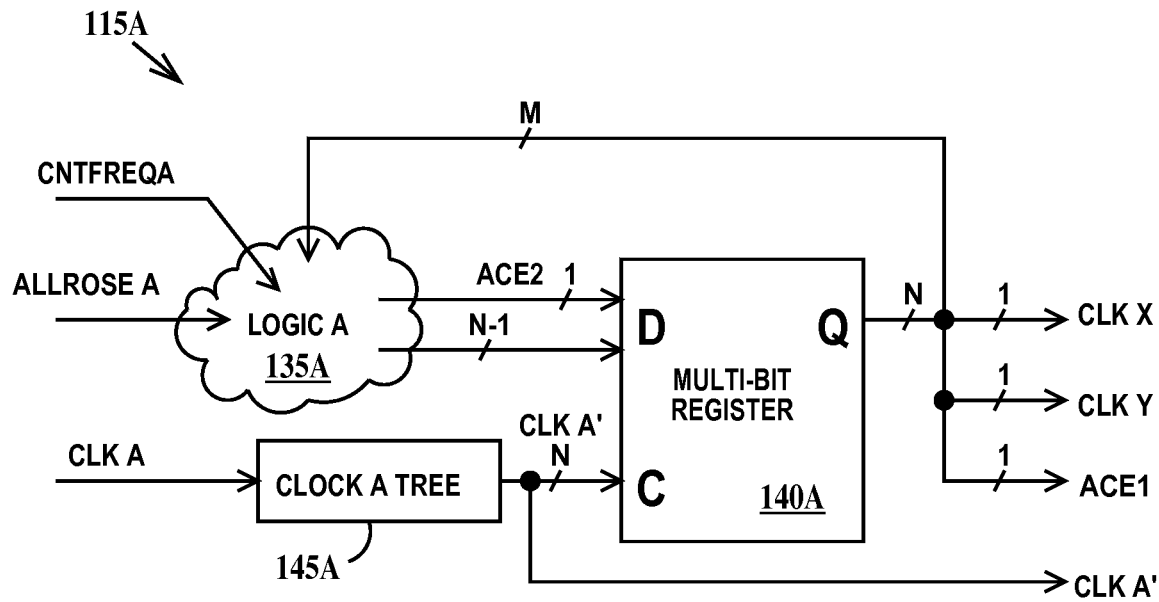
FIGS. 2A and 2B are schematic circuit diagrams of clock network divider circuits according to the first embodiment of the present invention.
Figure 2B:
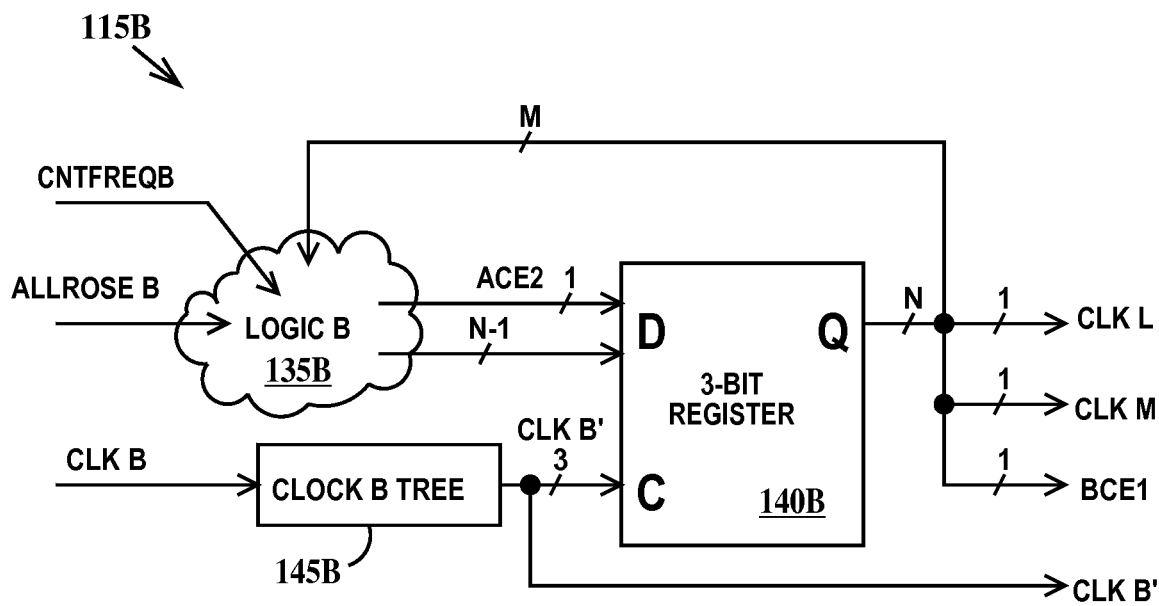

FIGS. 2A and 2B are schematic circuit diagrams of clock network divider circuits according to the first embodiment of the present invention. In FIG. 2A, CLK A divider network 115A includes a state logic circuit 135A coupled to a multi-bit Register 140A and a clock A tree 145A also coupled to the same multi-bit register 140A. Clock A tree 145A generates multiple CLK A' signals coupled to the respective clock inputs of multi-bit register 140A. CLK A' is delayed very slightly relative to CLK A (and almost insignificantly to one another) because of the inverters in clock A tree 145A. The outputs of multi-bit register 140A include CLK X, CLK Y and ACE1 which signals are coupled back to state logic circuit 135A. State logic circuit 135A generates a CLK A coincident edge in two CLK A' cycles signal (ACE2) as well as CLK X and CLK Y. State logic circuit 135A and multi-bit register 140A constitute an A clock domain finite state machine (FSM) who outputs include the signals CLK X, CLK Y and ACE1. ACE1 is derived from ACE2 because multi-bit register 140A delays ACE2 by one CLK A' cycle. One of ordinary skill in the art would be able to design a FSM as described supra.

In the present example, ALLROSE A is coupled to state logic circuit 135A and, state logic circuit 135A includes frequency divider circuits responsive to a control signal CNT-FREQA to change the frequencies of CLK X or CLK Y, but only on a rising edge of ALLROSE A.

FIG. 2B is similar to FIG. 2A except the CLK B domain is described. In FIG. 2B, CLK B divider network 115B includes a state logic circuit 135B coupled to a multi-bit Register 140B and a clock B tree 145B also coupled to the same form of multi-bit register 140B. Clock B tree 145B generates multiple CLK B' signals coupled to the respective clock inputs of multi-bit register 140B. CLK B' is delayed very slightly relative to CLK B (and almost insignificantly to one another) because of the inverters in clock B tree 145B. The output of multi-bit register 140A include CLK L, CLK M and BCE1. which signals are coupled back to state logic circuit 135B. State logic circuit 135B generates a CLK B coincident edge in two CLK B' cycles signal (BCE2) as well as CLK L and CLK M. State logic circuit 135B and multi-bit register 140B constitute a B clock domain finite state machine (FSM) who outputs include the signals CLK L, CKL M and BCE1 BCE1 is derived from BCE2 because multi-bit register 140B delays BCE2 by one CLK B' cycle.

In the present example, ALLROSE B is coupled to state logic circuit 135B and, state logic circuit 135B includes frequency divider circuits responsive to a control signal CNT-FREQB to change the frequencies of CLK L or CLK M, but only on a rising edge of ALLROSE B.

Figure 3:
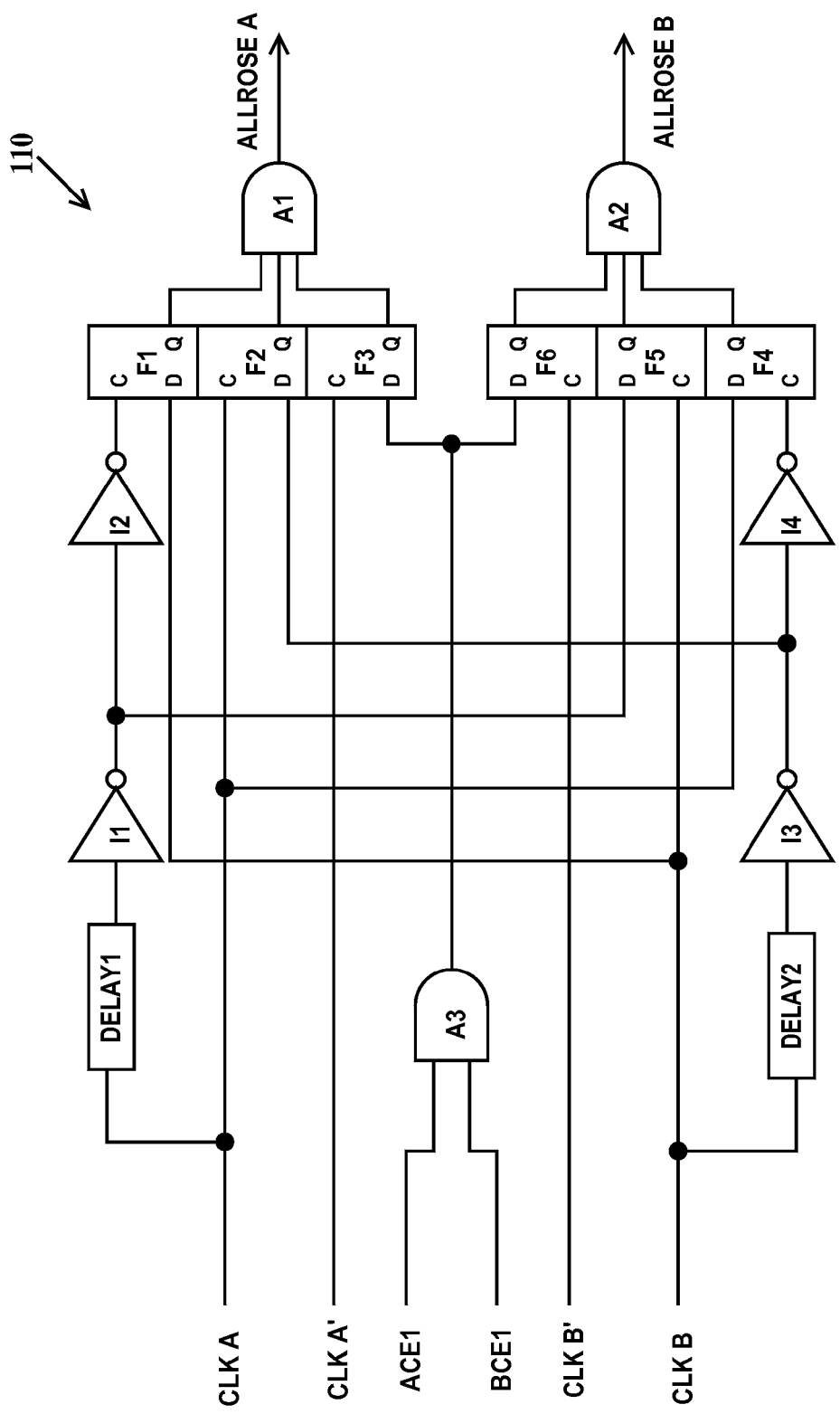
FIG. 3 is an exemplary schematic circuit diagram of a coincident clock edge detector circuit according to the first embodiment of the present invention.

FIG. 3 is an exemplary schematic circuit diagram of a coincident clock edge detector circuit according to the first embodiment of the present invention. In FIG. 3, CRED 110 includes delay elements DELAY1 and DELAY2, AND gates A1, A2 and A3, inverters I1, I2, I3 and I4 and rising-edge triggered flip-flops F1, F2, F3, F4, F5 and F6.

CLK A is coupled to the input of DELAY1, the clock input of flip-flop F2 and the data input of flip-flop F4. CLK B is coupled to the input of DELAY2, the clock input of flip-flop F5 and the data input of flip-flop F1. CLK A' is coupled to the clock input of flip-flop F3 and CLK B' is coupled to the clock input of flip-flop F6. The output of DELAY 1 is coupled to the input of inverter I1. The output of inverter I1 is coupled to the input of inverter I2 and the data input of flip-flop F5. The output of inverter I2 is coupled to the clock input of flip-flop F1. The output of DELAY 2 is coupled to the input of inverter I3. The output of inverter I3 is coupled to the input of inverter I4 and the data input of flip-flop F2. The output of inverter I4 is coupled to the clock input of flip-flop F4. ACE1 and BCE2 are coupled to respective inputs of AND gate A3 and the output of and GATE A3 is coupled to the data inputs of flip-flops F3 and F6. The data outputs of flip-flops F1, F2 and F3 are coupled to respective inputs of AND gate A1. The output of AND gate A1 is the signal ALLROSE A. The data outputs of flip-flops F4, F5 and F6 are coupled to respective inputs of AND gate A2. The output of AND gate A2 is the signal ALLROSE B.

In a first example, DELAY1 and DELAY2 are about one quarter of the period of one cycle of signal OSC if CLK A is OSC/K1 and if CLK B is equal to OSC/K2 when K1 and K2 are independently any whole positive integer. In a second example, DELAY1 and DELAY2 are about one half of the period of one cycle of signal OSC if CLK A is OSC/K1 and if CLK B is equal to OSC/K2 when K1 and K2 are independently any whole positive integer greater than or equal to 2

In operation, flip-flop F1 captures CLK B using a delayed rising edge of CLK A and flip-flop F2 captures delayed and inverted CLK B using a rising edge of CLK A. When flip-flop F1 latches a 1 and flip-flop F2 latches a 1, a rising edge of CLK B has been captured by a rising edge of CLK A. Flip-flop F4 captures CLK A using a delayed rising edge of CLK B and flip-flop F5 captures delayed and inverted CLK A using a rising edge of CLK B. When flip-flop F4 latches a 1 and flip-flop F5 latches a 1, a rising edge of CLK A has been captured by a rising edge on CLK B.

The output of AND gate A3 is a 1 only when both ACE1 and BCE1 are 1. ACE1 can only be 1 when the FSM of FIG. 2A detects CLK X and CLK Y will have coincident rising edges in one CLK A cycle. BCE1 can only be 1 when the FSM of FIG. 2B detects CLK L and CLK M will have coincident rising edges in one CLK B cycle. Both flip-flops F3 and F6 latch data from AND gate A3.

Thus, all clocks of all clock domains (e.g. CLK A, CLK X, CLK Y, CLK B, CLK L and CLK M) have coincident rising edges only when ALLROSE A and ALLROSE B have coincident rising edges.

By measuring the period between ALLROSE A and ALLROSE B having coincident rising edges, the next occurrence of ALLROSE A and ALLROSE B coincident rising edges can be determined and any or all of the clock frequencies (in the present example CLK X, CLK Y, CLK L and CLK M) may be changed via CNTFRQA and CNTFRQB (see FIGS. 2A and 2B) with no extraneous short or long pulses or data glitches.

It should be understood, that the flip-flop of multi-bit register 140A (see FIG. 2A) latching ACE1 and well as state logic circuits 135A (see FIG. 2A) may be moved from A clock network divider 115A (see FIG. 1) to CRED 110 (see FIG. 1). Likewise, the flip-flop of multi-bit register 140B (see FIG. 2B) latching BCE1 and well as state logic circuits 135A (see FIG. 2A) may be moved from B clock network divider 115B (see FIG. 1) to CRED 110 (see FIG. 1).

Alternatively, flip flops F3 and F6 (see FIG. 3) may be moved from CRED 110 (see FIG. 1) to respective A clock divider network 115A (see FIG. 1) and B clock divider network 115B (see FIG. 1).

Figure 4:
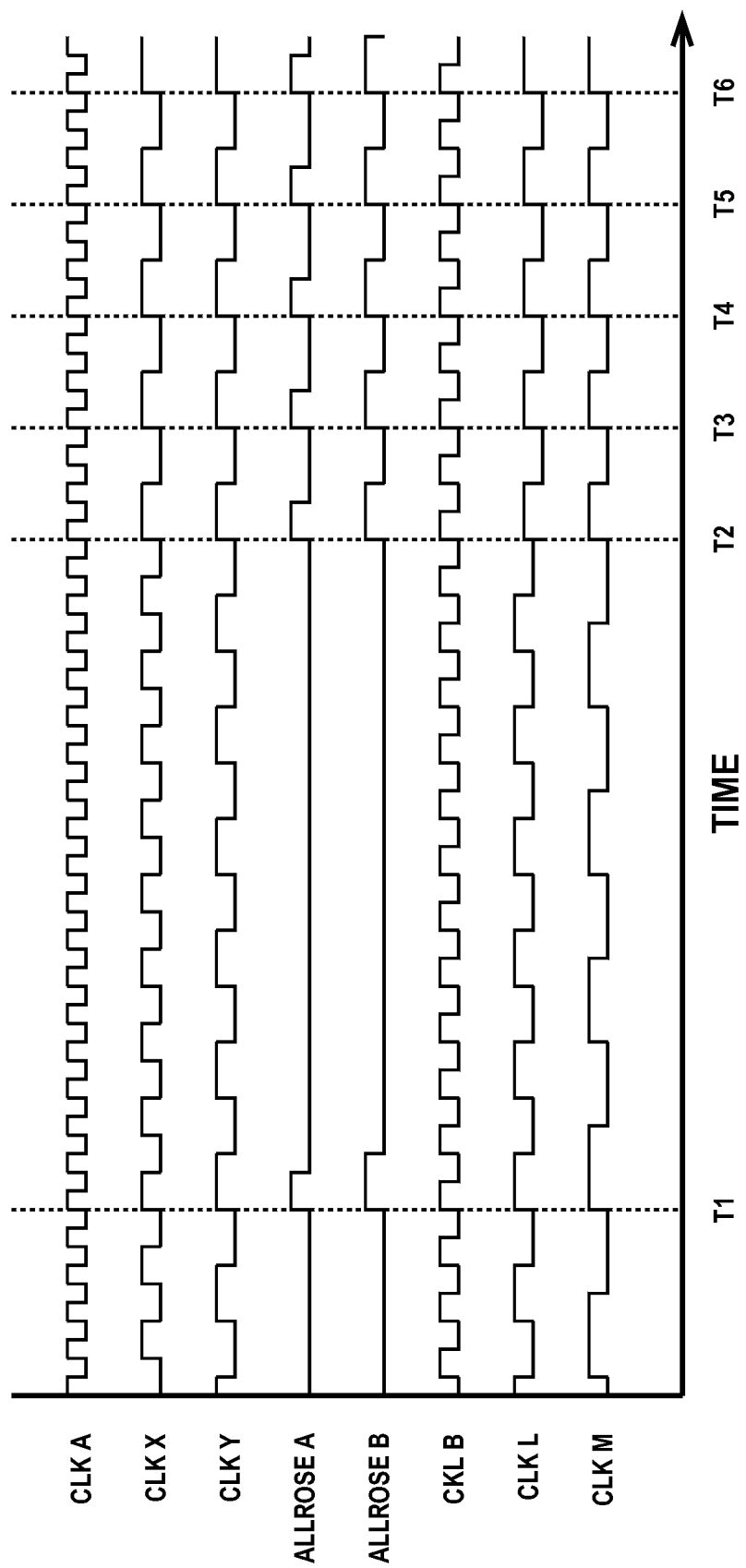
FIG. 4 is a timing diagram of the circuit of FIG. 1.

FIG. 4 is a timing diagram of the circuit of FIG. 1. The timing diagram of FIG. 4 is exemplary of only one of an almost limitless number of clock frequency change scenarios. In FIG. 4, CLK Y and CLK X are divided down from CLK A and CLK L and CLK M are divided down from CLK B. Initially, CLK A, CLK B, CLK X, (CLK Y and CLK L) and CLK M are running at different frequencies with CLK Y and CLK L at the same frequency. The first time CLK A, CLK B, CLK X, CLK Y, CLK L and CLK M have coincident rising edges is at time T1. The second time CLK A, CLK B, CLK X, CLK Y, CLK L and CLK M have coincident rising edges is at time T2, at which time the frequencies of CLK X and CLK M are changed and CLK X, CLK Y, CLK L and CLK M are the same frequency. Thereafter, CLK A, CLK B, CLK X, CLK Y, CLK L and CLK M have coincident rising edges at times T3, T4 . . . etc. All the clock duty cycles are illustrated as 50%. The only requirement to maintain a 50% duty cycle when a clock is changed is that both the CLK A and CLK B duty cycles be 50%. Other duty cycles may be used.

While the first embodiment of the present invention utilized coincident rising clock edges, the second embodiment of the present invention utilizes coincident falling clock edges.

Figure 5:
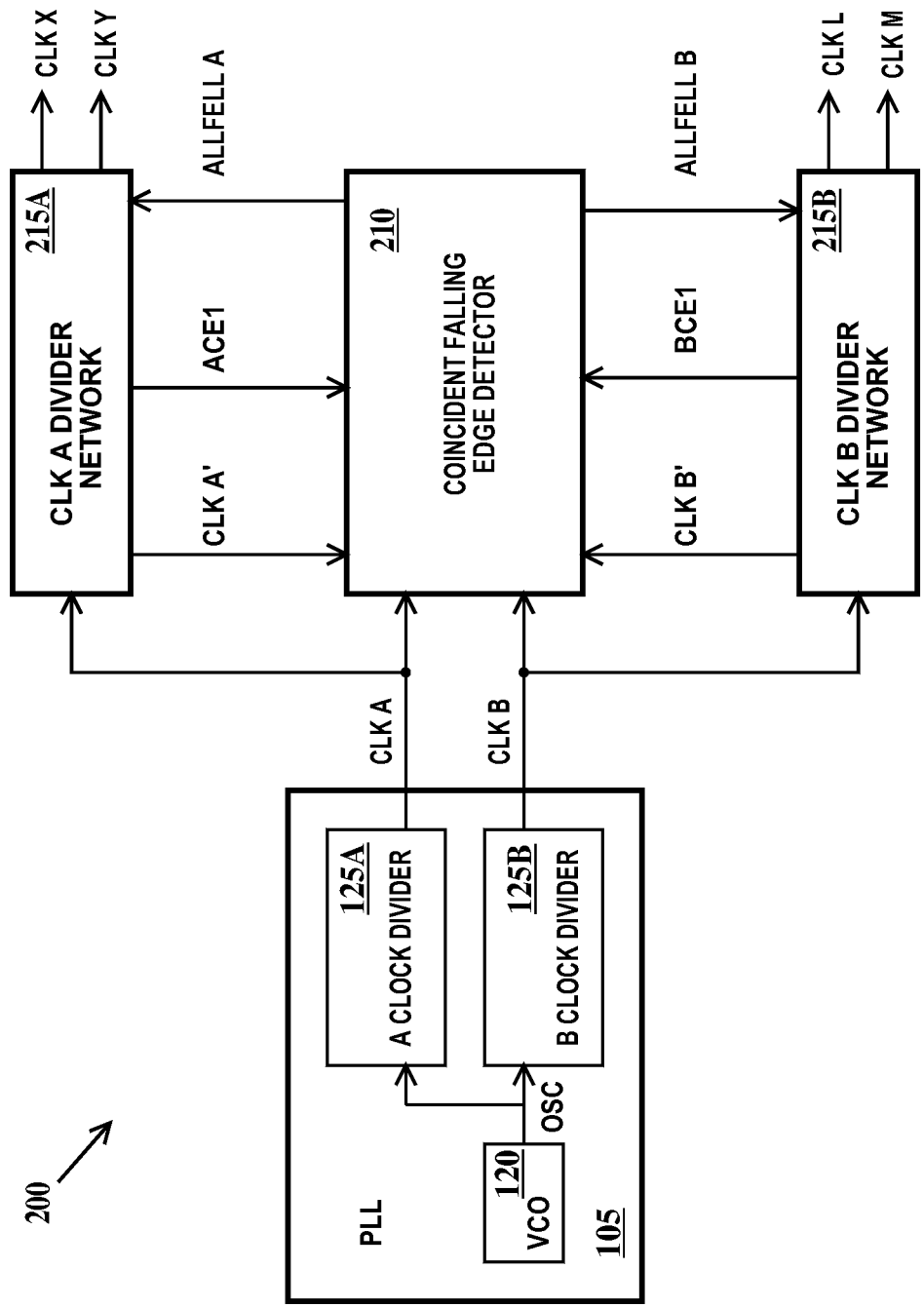
FIG. 5 is an exemplary schematic circuit diagram of a circuit for dynamically changing clock frequencies according to a second embodiment of the present invention.

FIG. 5 is an exemplary schematic circuit diagram of a circuit for dynamically changing clock frequencies according to a second embodiment of the present invention. In FIG. 5, a clock circuit 200 is similar to clock circuit 100 of FIG. 1, except CRED 110 is replaced with a coincident falling edge detector (CFED) 210, CLK A divider network 115A is replaced with an CLK A divider network 215A, CLK B divider network 115B is replaced with a CLK B divider network 215B and CFED 210 generates ALLFELL A and ALLFELL B signals instead of ALLROSE A and ALLROSE B signal, however, CLK A divider network 215A and CLK B divider network 215B respond to rising edges of ALLFELL A and ALLFELL B.

Figure 6A:
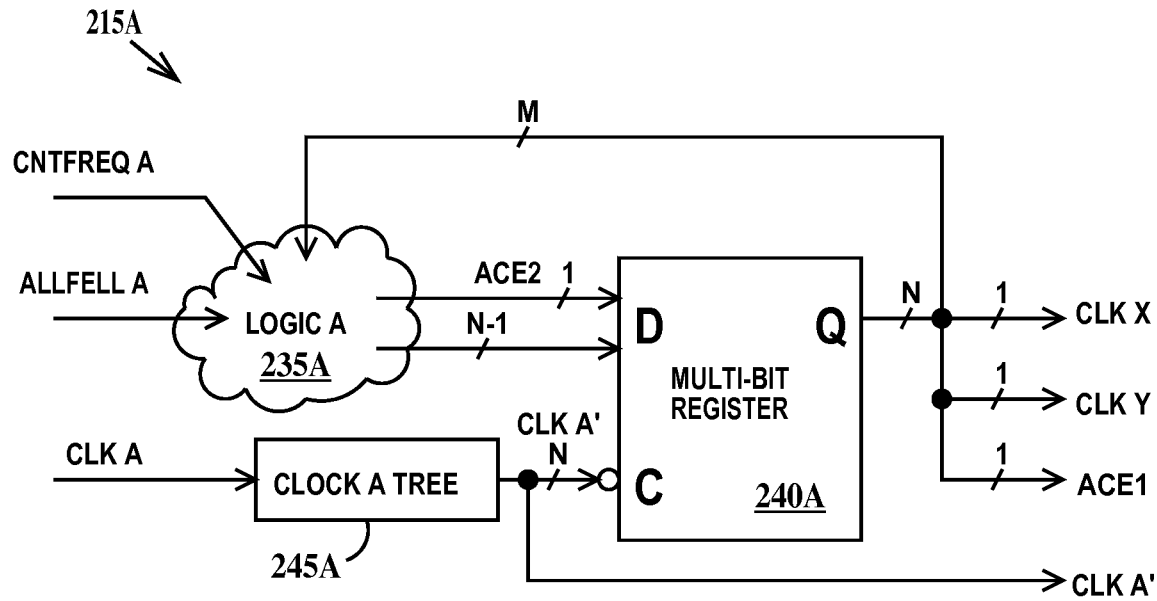
FIGS. 6A and 6B are schematic circuit diagrams of clock network divider circuits according to the second embodiment of the present invention.
Figure 6B:
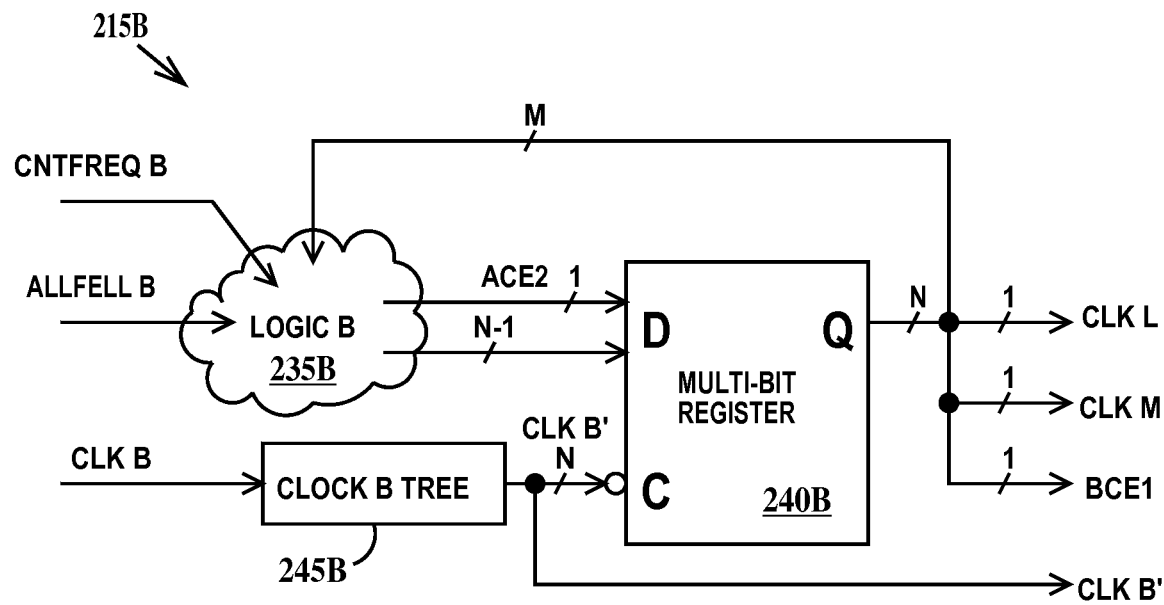

FIGS. 6A and 6B are schematic circuit diagrams of clock network divider circuits according to the second embodiment of the present invention. In FIG. 6A, CLK A divider network 215A is similar to CLK A divider network 115A of FIG. 2A except multi-bit register 140A of FIG. 2A is replaced with multi-bit register 240A which has an inverted clock input, state logic circuit 135A is replaced with state logic circuit 235A and ALLROSE A is replaced with ALLFELL A. Also, the FSM comprised of state logic circuit 235A and multi-bit register 240A is modified to change state on falling rather than rising clock edges.

In FIG. 6B, CLK B divider network 215B is similar to CLK B divider network 115B of FIG. 2B except multi-bit register 140B of FIG. 2B is replaced with multi-bit register 240B which has an inverted clock input, state logic circuit 135B is replaced with state logic circuit 235B and ALLROSE B is replaced with ALLFELL B. Also, the FSM comprised of state logic circuit 235B and multi-bit register 240B is modified to change state on falling rather than rising clock edges.

Figure 7:
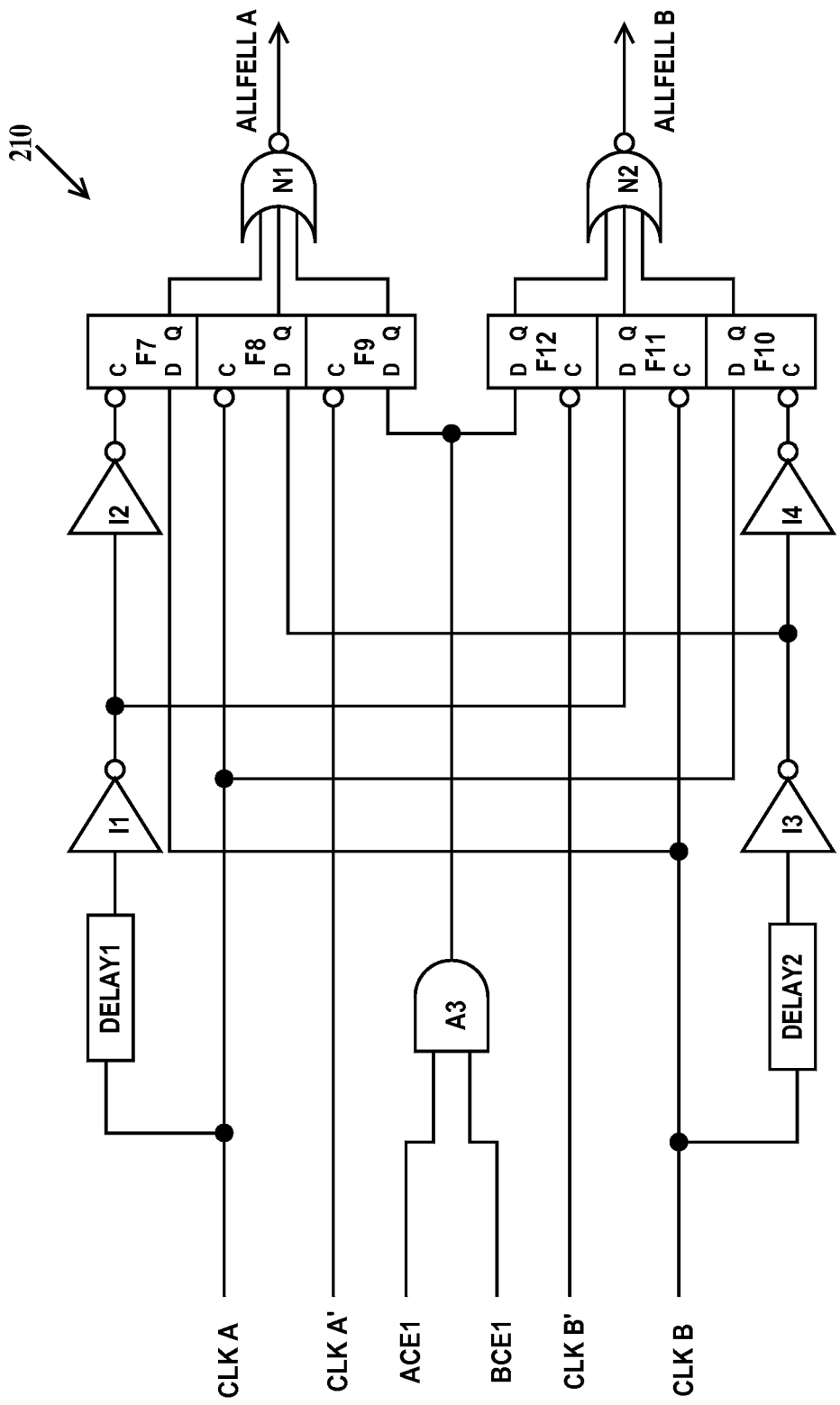
FIG. 7 is an exemplary schematic circuit diagram of a coincident clock edge detector circuit according to the second embodiment of the present invention.

FIG. 7 is an exemplary schematic circuit diagram of a coincident clock edge detector circuit according to the second embodiment of the present invention. In FIG. 7, CFED 210 is similar to CRED 110 of FIG. 3 except flip-flops F1, F2, F3, F4, F5 and F6 of FIG. 3 are replaced respectively with flip-flops F7, F8, F9, F10, F11 and F12 all of which have inverting clock inputs, and gates A1 and A2 of FIG. 3 are replaced with respective NOR gates N1 and N2 whose outputs are ALLFELL A and ALLFELL B respectively.

Figure 8:
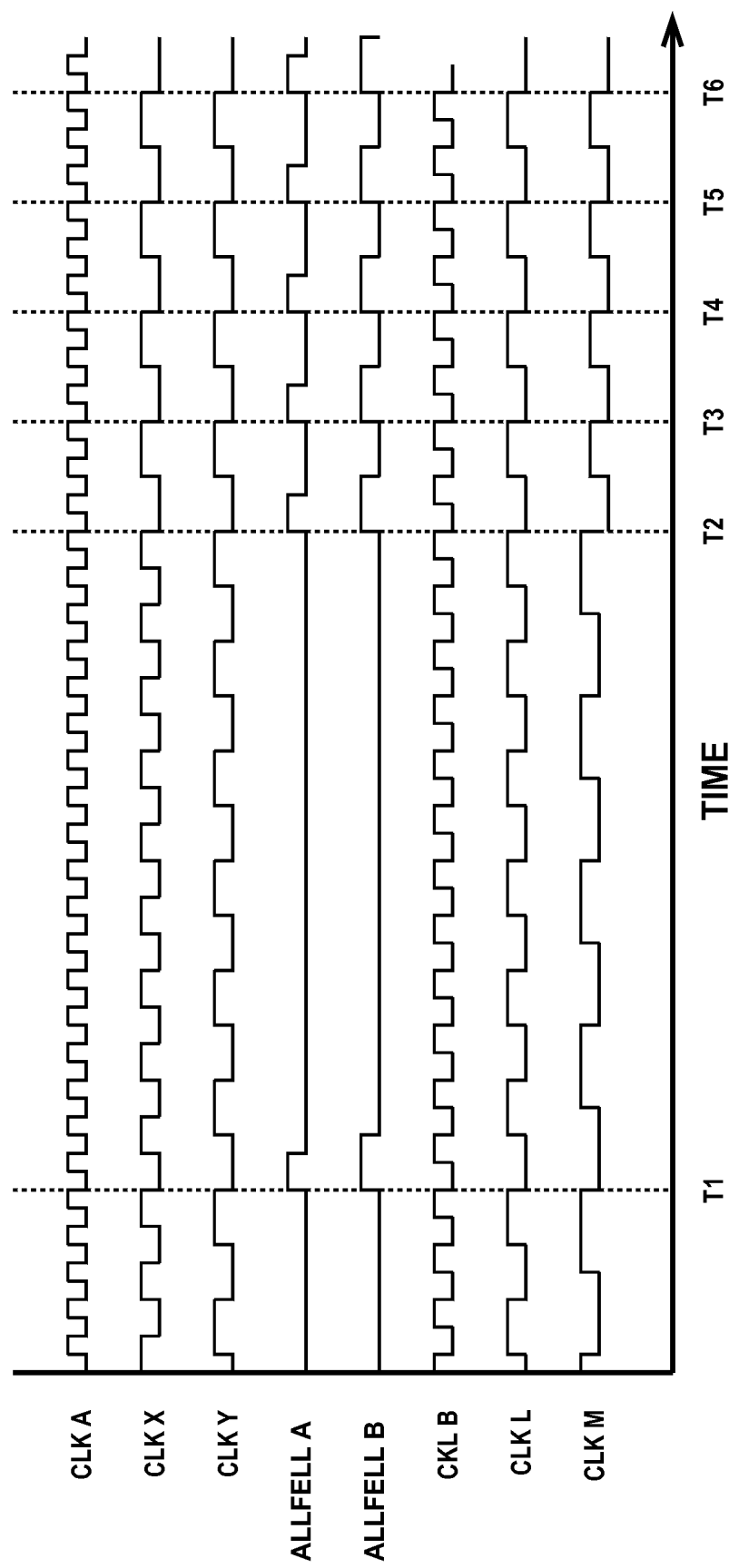
FIG. 8 is a timing diagram of the circuit of FIG. 5.

FIG. 8 is a timing diagram of the circuit of FIG. 5. The timing diagram of FIG. 8 is similar to the timing diagram of FIG. 4 except times T1, T2, T3 . . . etc occur on coincident falling edges of CLK A, CLK X, CLK Y, CLK B, CLK L, CLK M and coincident rising edges of ALLFELL A and ALLFELL B.

Figure 9:
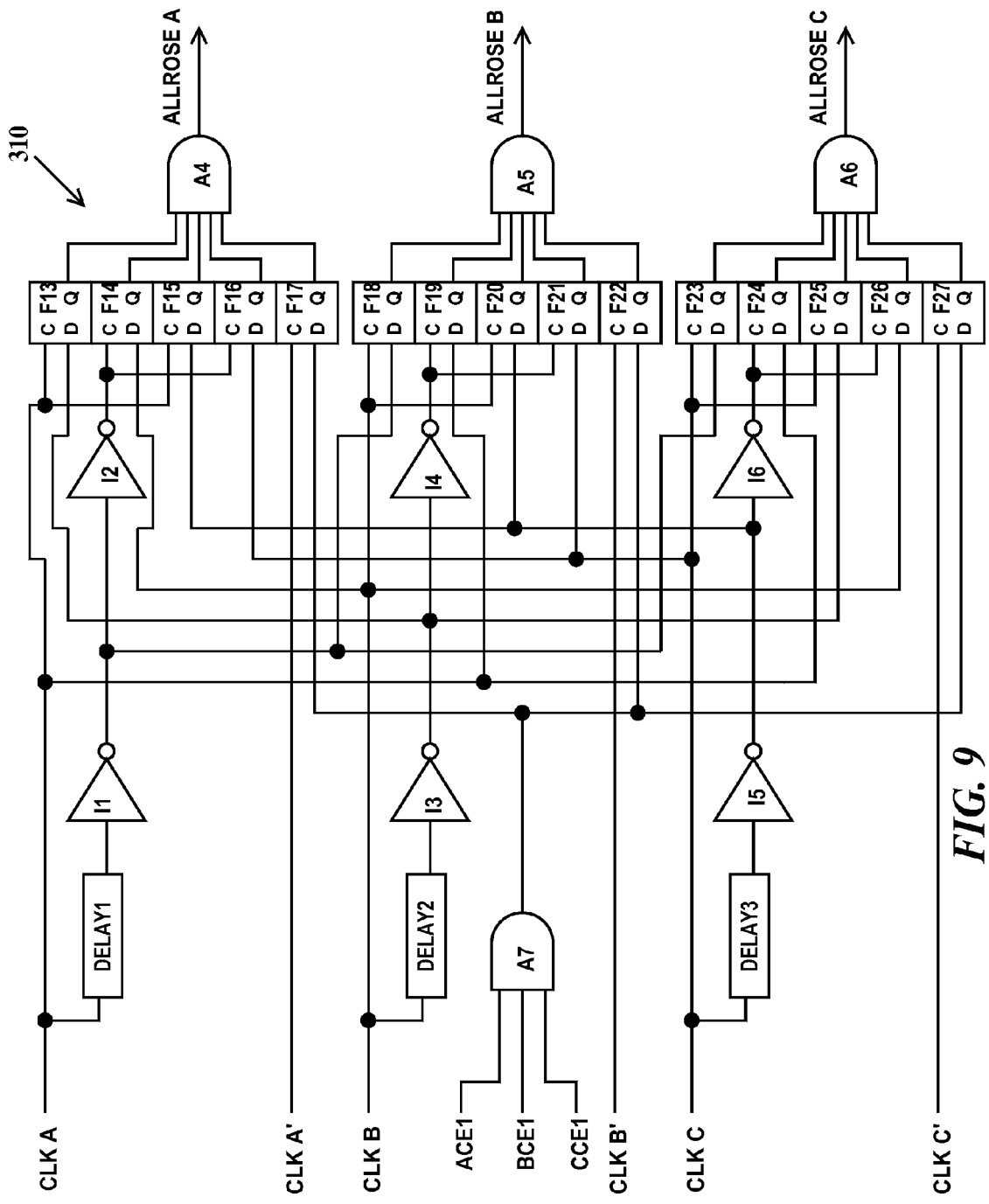
FIG. 9 is an exemplary schematic circuit diagram of a circuit for dynamically changing clock frequencies in three different clock domains according to a third embodiment of the present invention.

FIG. 9 is an exemplary schematic circuit diagram of a circuit for dynamically changing clock frequencies in three different clock domains according to third embodiment of the present invention. In FIG. 9, a CRED 310 includes delay elements DELAY1, DELAY2 and DELAY3, AND gates A4, A5, A6 and A7, inverters I1, I2, I3, I4, I5 and I6 and edge triggered flip-flops F13, F14, F15, F16, F17, F18, F19, F20, F21, F22, F23, F24, F25, F26 and F27.

CLK A is coupled to the input of DELAY1, the clock inputs of flip-flops F13 and F15 and the data inputs of flip-flops F19 and F24. CLK B is coupled to the input of DELAY2, the clock inputs of flip-flops F18 and F20 and the data inputs of flip-flops F14 and F26. CLK C is coupled to the input of DELAY3, the clock inputs of flip-flops F23 and F25 and the data inputs of flip-flops F16 and F21

CLK A' is coupled to the clock input of flip-flop F17, CLK B' is coupled to the clock input of flip-flop F22 and CLK C' is coupled to the clock input of flip-flop F27.

The output of DELAY 1 is coupled to the input of inverter I1. The output of inverter I1 is coupled to the input of inverter I2 and the data inputs of flip-flops F18 and F23. The output of inverter I2 is coupled to the clock inputs of flip-flops F14 and F16. The output of DELAY 2 is coupled to the input of inverter I3. The output of inverter I3 is coupled to the input of inverter I4 and the data inputs of flip-flops F13 and F25. The output of inverter I4 is coupled to the clock inputs of flip-flops F19 and F21. The output of DELAY 3 is coupled to the input of inverter I5. The output of inverter I5 is coupled to the input of inverter I6 and the data inputs of flip-flops F15 and F20. The output of inverter I6 is coupled to the clock inputs of flip-flops F24 and F26.

ACE1, BCE1 and CCE1 are coupled to respective inputs of AND gate A7 and the output of and GATE A7 is coupled to the data inputs of flip-flops F17, F22 and F27.

The data outputs of flip-flops F13, F14, F15, F16 and F17 are coupled to respective inputs of AND gate A4. The output of AND gate A4 is the signal ALLROSE A. The data outputs of flip-flops F18, F19, F20, F21 and F22 are coupled to respective inputs of AND gate A5. The output of AND gate A5 is the signal ALLROSE B. The data outputs of flip-flops F23, F24, F25, F26 and F27 are coupled to respective inputs of AND gate A6. The output of AND gate A6 is the signal ALLROSE C. One of ordinary skill in the art would be able to design circuits for generating CLK C, CLK C' and CCE1 (and CCE2) similar to the circuits described supra for generating CLK A, CLK B, CLK A', CLK B', ACE1, BCE1 (and ACE2 and BCE2).

The third embodiment of the present invention was described using coincident rising clock edges. One of ordinary skill in the art could revise the circuit of FIG. 9 to function on coincident falling clock edges.

The more general case of N clock domains 1 through N is more easily understood by an algorithm for designing a clock circuit of N clock domains according to a fourth embodiment of the present invention which while described in terms of coincident rising clock edges may be modified by one of ordinary skill in the art to use coincident falling clock edges.

For a coincident rising edge detector for N clocks there would be N outputs designated ALLROSE1 through ALLROSEN. Each ALLROSE signal would be the logical AND of the Q outputs of (2*(N−1)+1) flip-flops. Designating the clock inputs to the flip-flops as C1, C2, C3 through CN. There are three versions of each of the N clocks, a first to arrive in time, a non-delayed clock (CLK 1 through CLK N), a delayed and inverted clock (CLK 1D, CLK 2D, CLK 3D through CLK ND, and a delayed clock from the clock tree in the clock divider network, (CLK 1', CLK 2', CLK 3' through CLK N'). Each clock domain has a FSM which it drives. These FSMs divide down the clocks to generate some number of other integer divides of each clock. The FSMs also generate, respectively, signals 1CE2, 2CE2, 3CE2 through NCE2, which indicates that two of its clock cycles in the future, all of the clocks it generates will have a coincident rising edge.

Each of the signals 1CE2, 2CE2, 3CE2 through NCE is coupled to the data input of a flip-flop clocked by CLK 1', CLK 2', CLK 3' through CLK N' respectively so we now have N signals which indicate each corresponding FSM will generate all rising edges on its outputs in one of its respective clock cycles. These N flip-flops may just as easily be located inside each respective FSM as inside the coincident edge detector. By ANDing the N flip-flop outputs a signal P is generated. P is sampled by N flip flops, one each clocked by respective signals CLK 1', CLK 2', CLK 3' through CLK N'. The output of the N flip-flops are coupled to AND logic which generates the ALLROSE1, ALLROSE2, ALLROSE 3 through ALLROSE N signals. In fact, each flip-flop whose input P is the "+1" flip-flop in the formula (2*(N−1)+1). In FIG. 3, these are flip-flops F3 and F6. In FIG. 5, these are flip-flops F9 and F12. In FIG. 9, these are flip flops F17, F22 and F27. In general, the "+1" flip-flops are those whose data inputs are connected to the ANDed 1CE1 through NCE1 signals.

The other 2*(N−1) flip-flops are as follows: For each clock domain, there will be N−1 pairs of flip-flops. Each pair of flip-flops process information from the other clock domains, which is why there are N−1 pairs. Within each pair, the clock input of one flip-flop is coupled to an un-delayed clock and the clock input of the other flip-flop is coupled to the delayed clock. The data input of each pair of flip-flops of inputs will be another clock, or another clock delayed and inverted, such that each flip-flop receives both a clock and a delayed clock. The output of all these 2*(N−1) flip-flop are coupled to 2*(N−1) other inputs of the AND logic which generates the ALLROSE signals.

Algorithmically:

```
For I = 1 to N
    Create a flip-flop whose clock is I' and whose D input is P
    For J = 1 to N
        if I=J skip to the next J
        create a flip-flop whose D input is a delayed and inverted J
            clock and whose clock input is the I clock
        create another flip-flop whose D input is the J clock
            and whose clock input is the delayed I clock
    Next J
    ALLROSEI = the AND of all the flip-flops outputs created above
        for this value of I
Next I
```

Thus, embodiments of the present invention provide a method and circuit that allows dynamic clock frequency changes that does not require reliance on stored information of the ratio of the clock frequencies, cause glitches when the clock frequencies are changes, require a system wide reset or limit the frequencies of the clock signals.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   providing a coincident edge detector circuit adapted to detect coincident edges of a first clock signal and a first set of derived clock signals, a second clock signal and a second set of derived clock signals and to generate a first coincident edge detected signal and a second coincident edge detected signal when said first clock signal, said second clock signal, all clock signals of said first set of derived clock signals and all clock signals of said second set of derived clock signals have coincident edges;
   coupling a first clock divider network to said coincident edge detector circuit, said first clock divider network adapted to enable a change of frequency of a clock signal of said first set of derived clock signals in response to said first coincident clock edges detected signal; and
   coupling a second clock divider network to said coincident edge detector circuit, said second clock divider network adapted to enable a change of frequency of a clock signal of said second set of derived clock signals in response to said second coincident clock edges detected signal.

2. The method of claim 1, wherein said coincident edge detector comprises N clock domains, N first flip-flops, N(N−1) second flip-flops, N(N−1) third flip-flops, N AND gates, and a CE signal AND gate having N inputs, said N at least 2, and wherein for I=1, 2, . . . , N:
   said first flip-flop I has a first clock input coupled to a clock tree signal I and a data input is coupled to a signal P, said clock tree signal I being an output of a clock tree I whose input is a clock signal I;
   for J=1, 2, . . . , N subject to J not equal to I, said second flip-flop J has a data input coupled to an inverted and delayed clock signal J and a second clock input is coupled to said clock signal I, said third flip-flop J having a data input coupled to an un-inverted and un-delayed clock signal J and a third clock input coupled to a delayed clock signal I;

each input of said AND gate I is coupled to an output of said first flip-flop I, to outputs of said second flip-flops J corresponding to said flip-flops I, and to outputs of said third flip flops J corresponding to said flip-flop I, an output of each AND gate I being a signal indicating all said N clock domains have coincident rising edges or indicating all said N clock domains have coincident falling edges; and each input of said CE signal AND gate is coupled to a different CE signal of N CE signals, said CE signal I indicating an edge of said clock tree signal I occurring in one cycle of said clock signal I.

3. A circuit, comprising:

a coincident edge detector circuit adapted to detect coincident edges of a first clock signal and a first set of derived clock signals, a second clock signal and a second set of derived clock signals and to generate a first coincident edge detected signal and a second coincident edge detected signal when said first clock signal, said second clock signal, all clock signals of said first set of derived clock signals and all clock signals of said second set of derived clock signals have coincident edges;

a first clock divider network coupled to said coincident edge detector circuit, said first clock divider network adapted to enable a change of frequency of a clock signal of said first set of derived clock signals in response to said first coincident clock edges detected signal;

a second clock divider network coupled to said coincident edge detector circuit, said second clock divider network adapted to enable a change of frequency of a clock signal of said second set of derived clock signals in response to said second coincident clock edges detected signal;

wherein said coincident edge detector comprises N clock domains, N first flip-flops, N(N−1) second flip-flops, N(N−1) third flip-flops, N AND gates, and a CE signal AND gate having N inputs, said N at least 2, and wherein for I=1, 2 . . . N:

said first flip-flop I has a first clock input coupled to a clock tree signal I and a data input is coupled to a signal P, said clock tree signal I being an output of a clock tree I whose input is a clock signal I;

for J=1, 2 . . . N subject to J not equal to I, said second flip-flop J has a data input coupled to an inverted and delayed clock signal J and a second clock input is coupled to said clock signal I, said third flip-flop J having a data input coupled to an un-inverted and un-delayed clock signal J and a third clock input coupled to a delayed clock signal I;

each input of said AND gate I is coupled to an output of said first flip-flop I, to outputs of said second flip-flops J corresponding to said flip-flops I, and to outputs of said third flip flops J corresponding to said flip-flop I, an output of each AND gate I being a signal indicating all said N clock domains have coincident rising edges or indicating all said N clock domains have coincident falling edges; and each input of said CE signal AND gate is coupled to a different CE signal of N CE signals, said CE signal I indicating an edge of said clock tree signal I occurring in one cycle of said clock signal I.

4. The circuit of claim 3, wherein said first clock signal, said second clock signal, all clock signals of said first set of derived clock signals and all clock signals of said second set of clock signals coincident edges all are rising or all failing edges.

5. The circuit of claim 3, wherein:

said first clock divider network includes a first finite state machine adapted to generate said first set of derived clock signals from said first clock signal; and said second clock divider network includes a second finite state machine adapted to generate said second set of derived clock signals from said first signal clock signal.

6. The circuit of claim 5, wherein:

said first finite state machines comprises a first set of state logic circuits coupled to a first a multi-bit register; and said second finite state machines comprises a second set of state logic circuits coupled to a second multi-bit register.

7. The circuit of claim 6, wherein:

said first clock divider network includes a first clock tree coupled between said first clock signal and said first multi-bit register; and said second clock divider network includes a second clock tree coupled between said second clock signal and said second multi-bit register.

8. The circuit of claim 3, wherein:

said coincident edge detector circuit includes edge trigged flip-flops and states of said first clock signal, said second clock signal, a delayed first clock signal, a delayed second clock signal, a signal indicating coincident edges of said first and second clock signals will occur in one first clock cycle and one second clock cycle respectively are latched in said edge trigged flip-flops; and said first clock signal, said second clock signal, all clock signals of said first set of derived clock signals and all clock signals of said second set of derived clock signals coincident edges are all rising edges or all failing edges.

* * * * *